(12) United States Patent
Inzerillo et al.

(10) Patent No.: US 11,845,323 B2
(45) Date of Patent: Dec. 19, 2023

(54) VEHICLE ROOF COMPRISING A SHADING ARRANGEMENT AND GUIDE RAILS

(71) Applicant: Webasto SE, Stockdorf (DE)

(72) Inventors: Gioacchino Inzerillo, Stockdorf (DE); Gianluca Anedda, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 284 days.

(21) Appl. No.: 15/734,054

(22) PCT Filed: May 29, 2019

(86) PCT No.: PCT/EP2019/063962
§ 371 (c)(1),
(2) Date: Dec. 1, 2020

(87) PCT Pub. No.: WO2020/015907
PCT Pub. Date: Jan. 23, 2020

(65) Prior Publication Data
US 2021/0213809 A1    Jul. 15, 2021

(30) Foreign Application Priority Data
Jul. 17, 2018    (EP) .................................... 18184012

(51) Int. Cl.
*B60J 1/20*   (2006.01)
*B60J 7/00*   (2006.01)
(Continued)

(52) U.S. Cl.
CPC ........... *B60J 1/2052* (2013.01); *B60J 7/0015* (2013.01); *B60J 7/022* (2013.01); *B62D 25/06* (2013.01)

(58) Field of Classification Search
CPC ........ B60J 1/2052; B60J 7/0015; B60J 7/022; F16B 5/0664; Y10T 403/75; B62D 25/06
(Continued)

(56) References Cited

U.S. PATENT DOCUMENTS 6,065,801 A * 5/2000 Kawamura ............... B60J 7/022
296/213
6,513,864 B2   2/2003 Bohm et al.
(Continued)

FOREIGN PATENT DOCUMENTS

EP    1559600 A2 *  8/2005  ............. B60J 7/003
EP    2426365 A1    3/2012
(Continued)

OTHER PUBLICATIONS

Jean-Paul, "Sunshade for Transparent Panes of Motor Vehicles", Published Jan. 9, 2008, Publisher: European Patent Office, Edition: EP-1874573-B1 (Year: 2008).*
(Continued)

*Primary Examiner* — Amy R Weisberg
*Assistant Examiner* — Joyce Eileen Hill
(74) *Attorney, Agent, or Firm* — Fitch, Even, Tabin & Flannery, LLP

(57) ABSTRACT

A vehicle roof having a plate-shaped body-shell element and a shading arrangement which has a shading element and guide rails for laterally guiding the shading element. At least one fixing element is formed integrally on each of the guide rails at an upper side facing the body-shell element, said fixing element being in engagement with at least one molded portion which is molded to the body-shell element and has at least one fixing counterpart.

8 Claims, 4 Drawing Sheets

(51) Int. Cl.
*B60J 7/02* (2006.01)
*B62D 25/06* (2006.01)

(58) Field of Classification Search
USPC .................. 296/214, 216.06, 216.08, 216.09
See application file for complete search history.

(56) References Cited

U.S. PATENT DOCUMENTS

| | | | |
|---|---|---|---|
| 9,180,917 B1 * | 11/2015 | Wu | B62D 25/04 |
| 2010/0320808 A1 * | 12/2010 | Marx | B60J 7/0084 |
| | | | 296/217 |
| 2012/0003034 A1 | 1/2012 | Inaba et al. | |

FOREIGN PATENT DOCUMENTS

| | | | | |
|---|---|---|---|---|
| EP | 1874573 B1 * | 9/2015 | ............ | B60J 7/0015 |
| EP | 3 196 102 A1 | 7/2017 | | |

OTHER PUBLICATIONS

International Search Report and Written Opinion for PCT/EP2019/063962 dated Oct. 9, 2019 in English (11 pages).

* cited by examiner

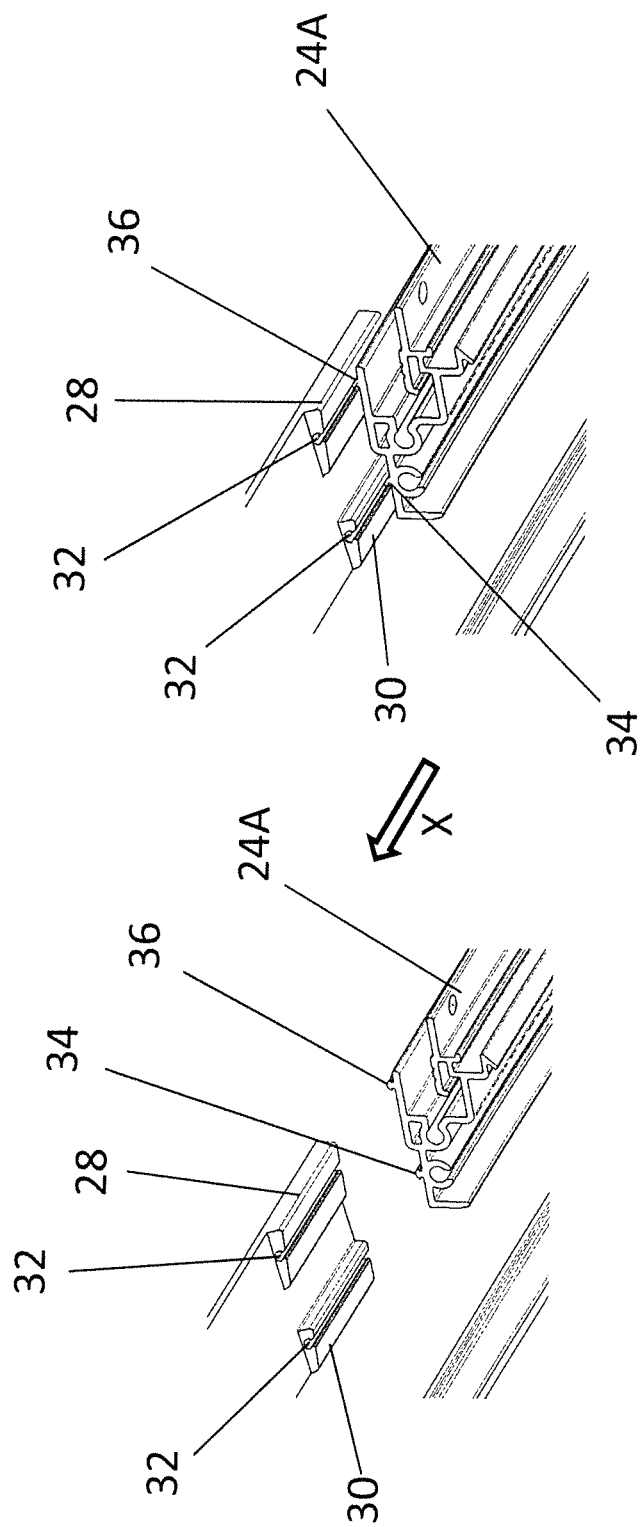

VEHICLE ROOF COMPRISING A SHADING ARRANGEMENT AND GUIDE RAILS

CROSS-REFERENCE TO RELATED APPLICATIONS

This application is a U.S. national phase application filed under 35 U.S.C. § 371 of International Application No. PCT/EP2019/063962, filed 29 May 2019, designating the United States, which claims priority from EP Application No. 18184012.5, filed 17 Jul. 2018, which are hereby incorporated herein by reference in their entirety for all purposes.

FIELD

The invention relates to a vehicle roof having the features of the preamble of claim 1.

BACKGROUND

From practical experience, vehicle roofs are known which are what is known as panoramic roofs and which have a vehicle-attached transparent fixed roof element on whose underside a shading arrangement in the form of a roller blind is disposed. The shading arrangement comprises guide rails for laterally guiding the roller blind which are attached via screws or a glue connection to an underside of the fixed roof element, which is made of glass, in particular. Thus, installation of the guide rails on the fixed roof element is complex, which, in turn, is reflected in the cost of the resulting vehicle roof.

SUMMARY

The object of the invention is to provide a vehicle roof that is configured according to the kind mentioned above and characterized by a shading arrangement that is easily installed.

According to the invention, said object is attained by a vehicle roof having the features of claim 1.

According to the invention, it is thus proposed for the body-shell element on the one hand to be provided with a molded portion and for the guide rails on the other hand to have a fixing element which is in direct engagement with the molded portion. In this way, no additional connecting elements, such as screws or glue strips, are needed to install the guide rails of the shading arrangement on the body-shell element. Instead, the fixing element simply has to be engaged with the molded portion or, more precisely, with the fixing counterpart of the molded portion. Owing to the thus simplified installation, the manufacturing work for the resulting vehicle roof decreases as well, which, in turn, is reflected in reduced cost.

In a specific embodiment of the vehicle roof according to the invention, the fixing element is a rib which preferably has a T-shaped or mushroom-shaped cross-section, whereas the fixing counterpart has a recess in which the rib is accommodated and which is provided with an undercut for securing the rib. The rib, which forms the fixing element, can be molded along with the guide rails directly during production thereof. Said production is performed according to an extrusion molding process, for example.

The molded portion, which is formed on the body-shell element, is preferably molded to the body-shell element by foaming or injection molding. The recess that accommodates the rib and has an undercut can be molded during said molding process. When the body-shell element is removed from the respective mold, forced demolding may occur due to the undercut.

In a specific embodiment of the vehicle roof according to the invention, the body-shell element and the molded portion form a two-component injection-molded part. The body-shell element forms a first component thereof and the molded portion forms a second component thereof. For example, the first component is transparent in its cured state, whereas the second component, which forms the molded portion, is made of an opaque material.

To ensure that the guide rails are securely attached to and precisely aligned on the body-shell element, each guide rail can comprise two ribs which are aligned parallel so as to form two fixing elements and each of which preferably has a T-shaped or mushroom-shaped cross-section.

The two ribs of the guide rail can each engage into recesses of the molded portion in a manner alternating along the longitudinal extension of the guide rail. In this way, multiple fixing counterparts each having a recess for both ribs can be formed on the molded portion for each of the two ribs. This embodiment is particularly suitable for installation of the guide rails in an installation direction oriented at a right angle to the plane of the body-shell element. Here, the two ribs are alternately pressed into the respective recesses of the molded portion.

In an alternative embodiment of the vehicle roof according to the invention, the two ribs of the guide rail are each at least almost entirely accommodated in a respective recess of the molded portion across their length. This embodiment is particularly suitable for a manner of installation in which the ribs are inserted into the recesses of the guide rail in the longitudinal direction. So it is a longitudinal manner of installation.

Of course, it is also conceivable that the parallel recesses for the two ribs of the guide rail are interrupted, which means that the ribs each engage in parallel into the recesses of the molded portion or molded portions at the two ends of the guide rail only, for example.

The shading element of the vehicle roof according to the invention is a roller blind panel, in particular, but it can also be a sliding headliner or the like.

Other advantages and advantageous features of the subject-matter of the invention are apparent from the description, the drawing and the claims.

BRIEF DESCRIPTIONS OF THE DRAWINGS

In the drawing, embodiments of a vehicle roof according to the invention are illustrated in a schematically simplified manner and will be explained in more detail in the following description.

FIG. 1 shows a schematic top view of a vehicle roof having guide rails attached to a fixed roof element;

FIG. 2*a* shows a section through the vehicle roof of FIG. 1 along line II-II in FIG. 1;

FIG. 2*b* shows a section corresponding to FIG. 2*a* through the vehicle roof, but with a guide rail in a pre-installation position;

FIG. 3*a* shows a section through the vehicle roof of FIG. 1 along line III-III in FIG. 1;

FIG. 3*b* shows a section corresponding to FIG. 3*a* through the vehicle roof, but with the guide rail in a pre-installation position;

FIG. 5a shows a perspective bottom view of a front-side section of the vehicle roof of FIG. 4 with a guide rail in a pre-installation position; and FIG. 5b shows a bottom view, corresponding to FIG. 5a, of the vehicle roof of FIG. 4, but during installation of the guide rail.

DETAILED DESCRIPTION

Figure 1:
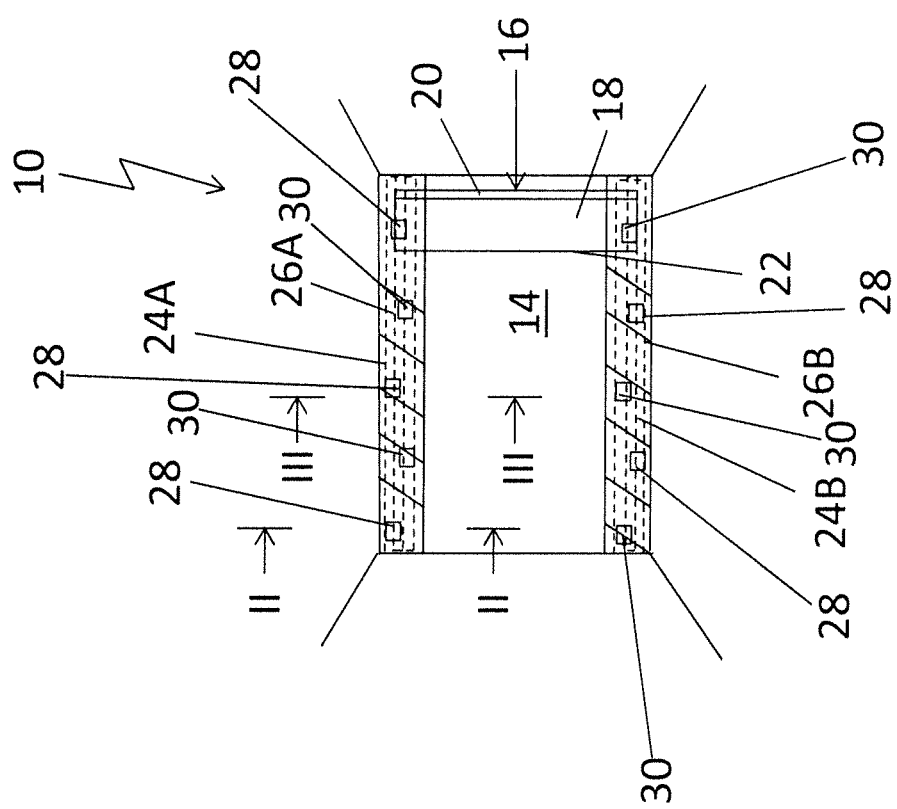
Figure 2A:
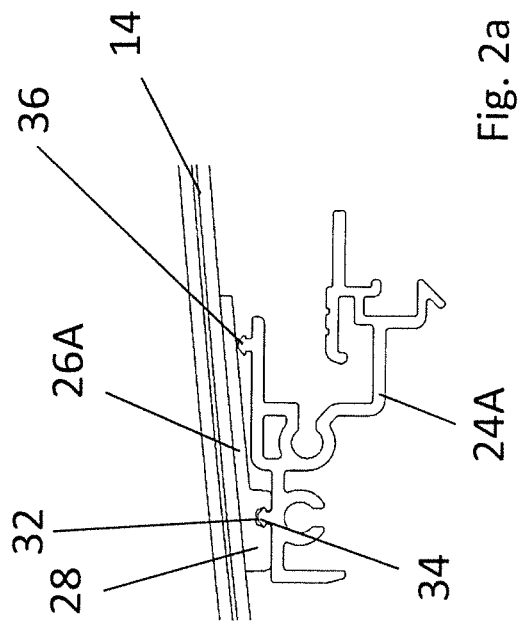
Figure 3A:
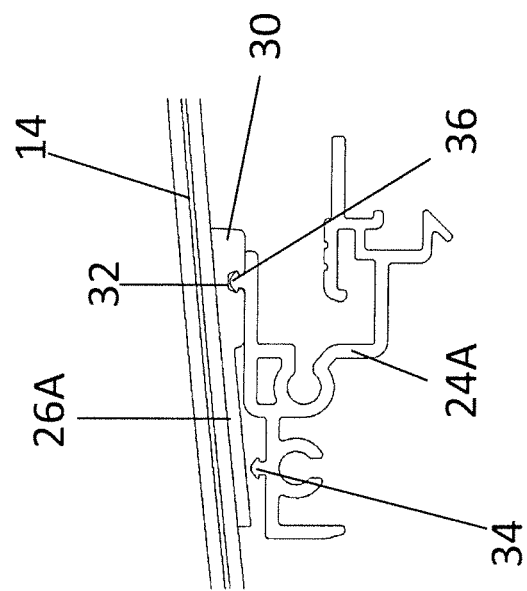
Figure 2B:
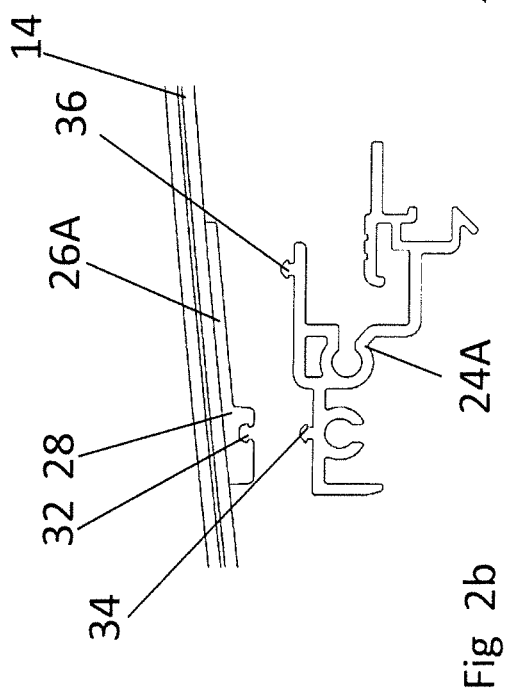
Figure 3B:
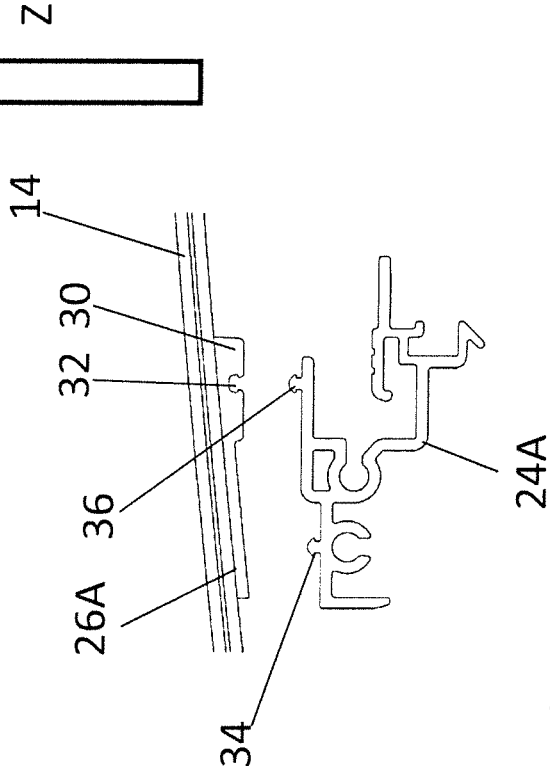

FIGS. 1 to 3b illustrate a vehicle roof 10 which is configured as a panoramic roof which has a fixed roof element 14 made of glass and rigidly connected to the vehicle body.

The fixed roof element 14, which constitutes a body-shell element, is a glass pane which is provided with a shading arrangement 16 at its underside. The shading arrangement 16 comprises a roller blind panel 18, which constitutes a shading element and can be wound onto a winding shaft 20 disposed in a rear-side edge portion of the fixed roof element 14 and extending in the transverse direction of the roof. The roller blind panel 18, which has a pull bar 22 at its front-side edge facing away from the winding shaft 20, is guided in a guide rail 24A, 24B at each of its lateral edges extending in the longitudinal direction of the vehicle.

The guide rails 24A and 24B are each attached to the underside of the fixed roof element 14. For this purpose, at its underside, the fixed roof element 14 is provided with a molded portion 26A, 26B on either side of a vertical longitudinal center plane of the roof, the molded portions 26A and 26B being made of a polyurethane material and molded to the glass pane by foaming. At its underside, the molded portion 26 has fixing counterparts 28 and 30, each of which is formed by a protrusion and in each of which a groove-like recess 32 provided with an undercut is formed. The fixing counterparts 28 and their recesses 32 serve to receive a first rib 34, which is formed integrally on the upper side of each guide rail 24A, 24B, and the fixing counterparts 30 and their recesses 32 serve to receive a second rib 36, which is formed integrally on the upper side of the respective guide rail 24A, 24B. The ribs 34 and 36, which constitute fixing elements, each have a T-shaped or mushroom-shaped cross-section which corresponds to the cross-section of the recesses 32. Additionally, the fixing counterparts 28 and 30, which are formed by protrusions in a manner alternating in the longitudinal direction of the roof, each have a plane contact surface for a counterface of the respective guide rail 24A, 24B.

As can be seen in FIGS. 2a, 2b, 3a, and 3b, the guide rails 24A and 24B are installed from below at right angles to the plane of the fixed roof element 14 in such a manner that the ribs 34 and 36, one by one or simultaneously, are pushed into the groove-like to recesses 32 of the fixing counterparts 28 and 30 from below, as indicated by arrow Z. Thus, a secure and stable attachment of the guide rails 24A and 24B to the fixed roof element 14 is achieved via the ribs 34 and 36.

Figure 4:
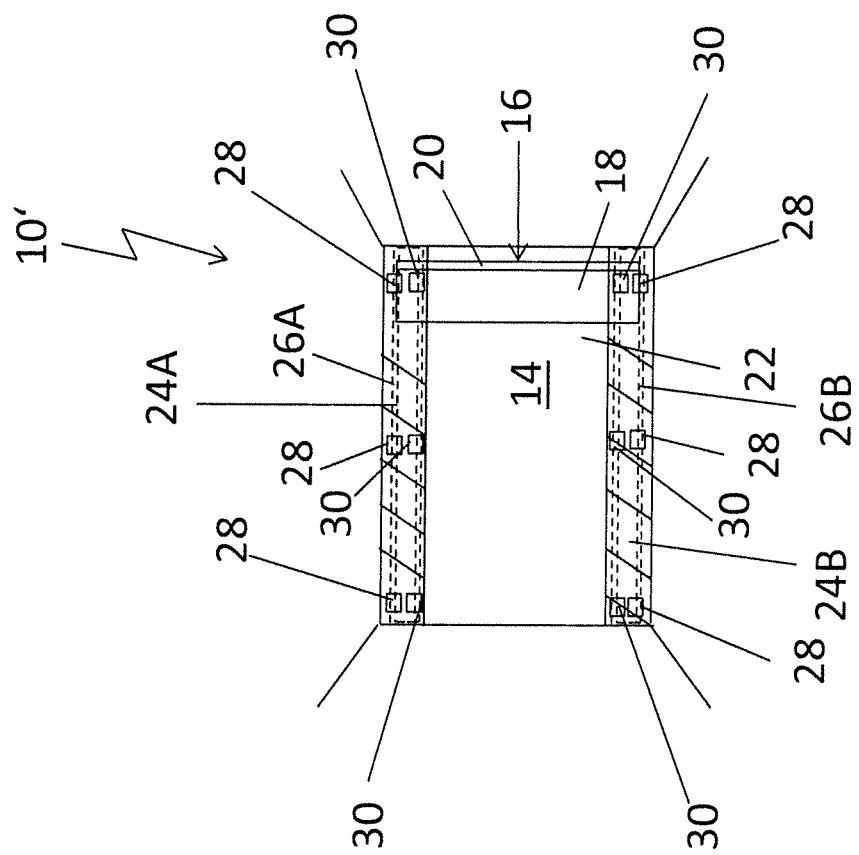
FIG. 4 shows a schematic top view of an alternative embodiment of a vehicle roof having guide rails attached to a fixed roof element.

FIG. 4 shows another embodiment of a vehicle roof 10' according to the invention, which differs from that of FIG. 1 in that molded portions 26A and 26B for attaching the guide rails 24A and 24B are formed on the underside of the fixed roof element 14, each molded portion 26A, 26B having two fixing counterparts 28 and 30 which are disposed next to each other in the transverse direction of the vehicle and which are formed on both ends of the guide rails 24A and 24B and in a middle portion of the guide rails 24A and 24B. As can be seen in FIGS. 5a and 5b, the fixing counterparts 28 and 30 each have a groove-like recess 32 having a T-shaped or mushroom-shaped cross-section, i.e. having an undercut, which is engaged by a rib 34, 36 whose cross-section corresponds to the respective recess 32 formed on the upper side of the respective guide rail 24A, 24B, which is an extruded aluminum profile.

In the vehicle roof 10' illustrated in FIG. 4, the guide rails 24A and 24B are installed on the fixed roof element 14 in that the ribs 34 and 36 are inserted into the recesses 32 of the fixing counterparts 28 and 30 of the molded portions 26A and 26B in the longitudinal direction, as indicated by arrow X.

In a special embodiment which is not shown, the vehicle roof can be additionally provided with a front-side transparent roof element which is part of a sunroof system and which can be displaced in the longitudinal direction of the roof in order to open and close a corresponding roof opening. Then, above a backseat area of the vehicle in question, the vehicle roof has the fixed roof element which is rigidly connected to the vehicle body and which is made of glass and which is disposed to the rear of the displaceable roof element and which is provided with a shading arrangement of the aforementioned type.

REFERENCE SIGNS 10, 10' vehicle roof
14 fixed roof element
16 shading arrangement
18 roller blind panel
20 winding shaft
22 pull bar
24A, B guide rail
26A, B molded portion
28 fixing counterparts
30 fixing counterparts
32 recess
34 rib
36 rib

The invention claimed is:

1. A vehicle roof, comprising:
a plate-shaped body-shell element and a shading arrangement which has a shading element and guide rails for laterally guiding the shading element,
wherein at least one fixing element is formed integrally on each of the guide rails at an upper side facing the body-shell element,
said fixing element being in engagement with at least one molded portion which is molded to the body-shell element and comprises at least one fixing counterpart,
wherein for two said fixing elements, each guide rail comprises two ribs which are aligned parallel to each other across the rail and each of which has a T-shaped or mushroom-shaped cross-section; and
wherein the two ribs are each engaged into a recess of the molded portion being the fixing counterpart.

2. The vehicle roof according to claim 1 wherein the fixing counterpart is provided with an undercut.

3. The vehicle roof according to claim 1, wherein the molded portion is molded to the body-shell element by foaming or by injection molding.

4. The vehicle roof according to claim 1, wherein the body-shell element forms a first component and the molded portion forms a second component of a two-component injection-molded part.

5. The vehicle roof according to claim 1, wherein the two ribs each engage into a recess of the respective molded portion in a manner alternating along the longitudinal extension of the guide rails, and the recesses for one rib and the recesses for the other rib are offset from each other in the longitudinal direction of the roof.

6. The vehicle roof according to claim 1, wherein the two ribs engage into recesses of the respective molded portion which are located next to each other in the transverse direction of the guide rails.

7. The vehicle roof according to claim 1, wherein across their length, the two ribs are each at least almost entirely accommodated in a respective recess of the respective molded portion.

8. The vehicle roof according to claim 1, wherein the shading element is a roller blind web.

* * * * *